(No Model.)
W. B. PAGE & A. E. HOPKINS.
SOLDERING IRON.
No. 580,555. Patented Apr. 13, 1897.
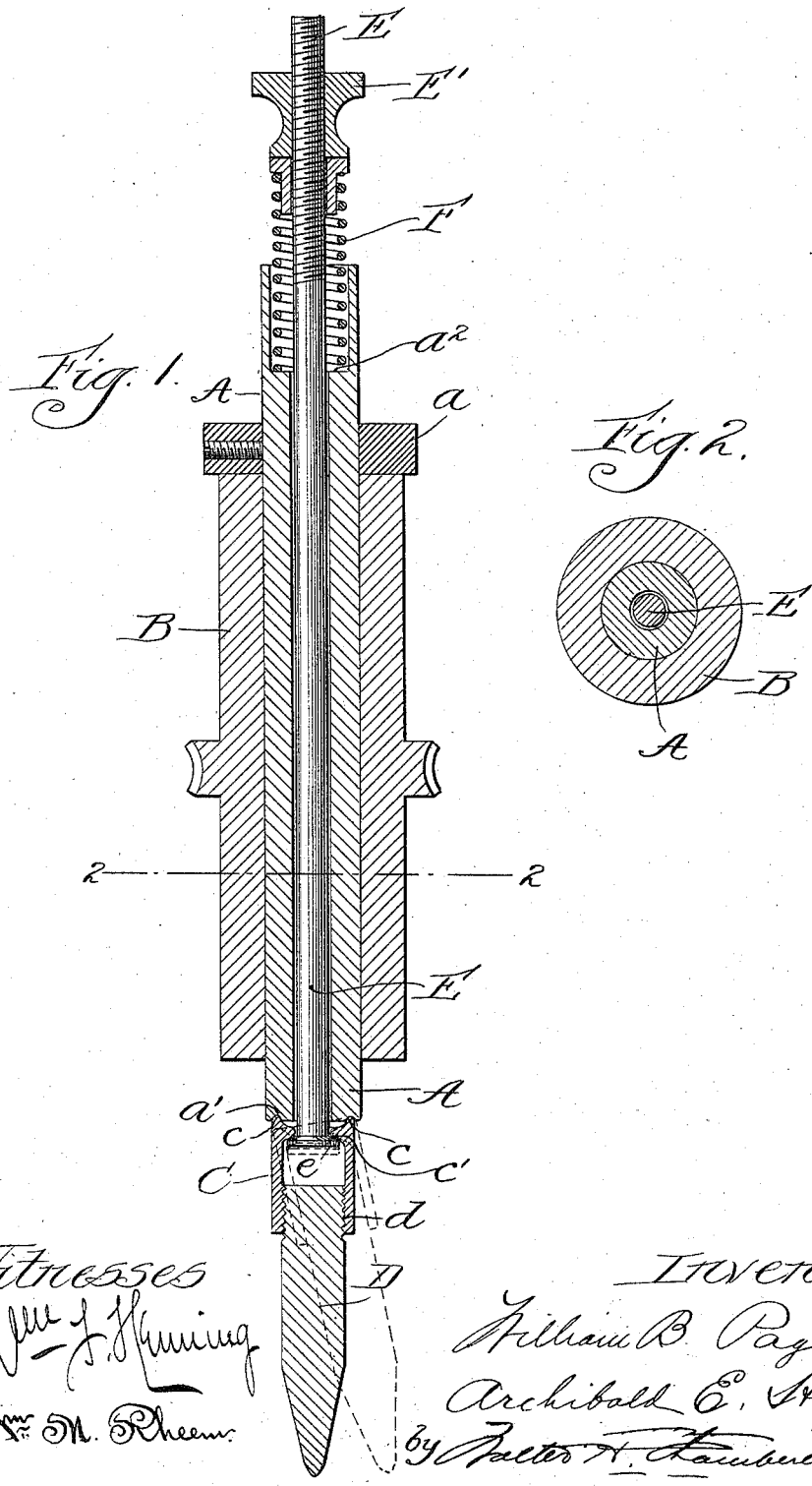
Witnesses
Inventors
William B. Page
Archibald E. Hopkins
by Walter H. Chambers Atty.
THE NORRIS PETERS CO., PHOTO-LITHO., WASHINGTON, D. C.

United States Patent Office.

WILLIAM B. PAGE AND ARCHIBALD E. HOPKINS, OF DIXON, ILLINOIS, ASSIGNORS, BY MESNE ASSIGNMENTS, TO THE ANGLO-SWISS CONDENSED MILK COMPANY, OF CHAM, SWITZERLAND.

SOLDERING-IRON.

SPECIFICATION forming part of Letters Patent No. 580,555, dated April 13, 1897.

Application filed September 3, 1896. Serial No. 604,736. (No model.)

*To all whom it may concern:*

Be it known that we, WILLIAM B. PAGE and ARCHIBALD E. HOPKINS, citizens of the United States, residing at Dixon, county of Lee, State of Illinois, have invented a certain new and useful Improvement in Soldering-Irons; and we declare the following to be a full, clear, and exact description of the invention, such as will enable others skilled in the art to which it pertains to make and use the same, reference being had to the accompanying drawings, which form a part of this specification.

Our invention has for its object the production of a soldering-iron for use more particularly in an automatic soldering-machine, although it is obvious that it might be used as a hand-tool, if desired.

The invention consists, essentially, in making the end of the iron, that is, the copper portion which is heated and which comes in contact with the solder, movable or flexible with respect to the holder.

In the drawings, Figure 1 is a longitudinal section of our soldering-iron. Fig. 2 is a section on the line 2 2, Fig. 1.

In carrying out the invention, A represents a suitable cylinder or sleeve constituting the holder. This sleeve is provided with an adjustable collar $a$, so that its position within the sleeve B on the machine may be regulated. It is obvious that the iron may be held in any suitable way within the machine, and we have therefore shown simply a sleeve B, forming a part of the machine, for that purpose. The end of the sleeve A is grooved, as at $a'$.

C is a smaller sleeve having a rounded projection $c$, which fits in the groove $a'$ in the end of the sleeve A. Within the sleeve C and adjacent to the end $c$ is an annular projection $c'$.

D is the soldering-iron proper—that is, the copper portion which is heated and which comes in contact with the solder. Of course this soldering end may be of any other suitable material than copper, if desired. The soldering end D is engaged in the end of the socket C by the screw-threads $d$.

E is a rod having a headed end $e$, that engages the flange $c'$ on the interior of the sleeve C and extends the length of the holder-sleeve A. On its opposite end it is provided with an adjustable nut $E'$.

F is a spring, one end bearing on the nut $E'$ and the other end bearing on the shoulder $a^2$ of the sleeve A, the spring thus exerting a tension to hold the sleeve C against the holder A and thus normally maintain the soldering end in alinement with the holder; but, as will be seen, should any lateral pressure come upon the soldering end the spring F would yield and allow the soldering-iron to tilt, as shown by the dotted lines. By thus making the soldering end movable or flexible with respect to the holder when the iron is in use and comes against any obstruction or irregularity in the surface to be soldered the soldering end will yield sufficiently so that the parts are not disarranged.

This form of soldering-iron is designed particularly for use in connection with the machine shown in the pending application of Page and Hausheer, Serial No. 576,778, filed January 25, 1896, wherein the iron is held in a revolving cylinder so the iron is revolved on its own axis, and while we prefer to use the iron in this way yet it is obvious that it might be used in many other forms of machines and in many other ways without departing from the spirit of our invention, which consists, essentially, in making the soldering end of the iron movable or flexible with respect to its holding-stem.

What we claim is—

1. A substantially pointed soldering-iron having its end yieldingly movable in any direction with respect to its holding-stem, substantially as described.

2. A substantially pointed soldering-iron having its end yieldingly movable in any direction with respect to its holding-stem and held normally in its proper position by spring-pressure, substantially as described.

3. A soldering-iron having its soldering end disconnected from but yieldingly movable in any direction with relation to its holding-stem and held thereto by spring-pressure, substantially as described.

4. A soldering-iron consisting of the soldering end, a holding-stem, against the end of which the soldering end is held and a spring for keeping the parts normally together end to end substantially as described.

5. A soldering-iron consisting of a holding-sleeve a soldering end provided with an annular projection which enters a corresponding groove in the end of the holding-sleeve and a rod engaged to the soldering end extending longitudinally through the holding-sleeve and provided on its end with an adjustable nut and a spring between the nut and the end of the sleeve substantially as described.

In testimony whereof we sign this specification in the presence of two witnesses.

WILLIAM B. PAGE.
   ARCHIBALD E. HOPKINS.

Witnesses:
 ALBERT R. ASHLEY,
 G. B. BRUBAKER.